United States Patent
Ellis

[11] Patent Number: 6,148,532
[45] Date of Patent: Nov. 21, 2000

[54] FLATNESS GAGE

[75] Inventor: Robert W. Ellis, Cincinnati, Ohio

[73] Assignee: General Electric Company, Cincinnati, Ohio

[21] Appl. No.: 09/182,782

[22] Filed: Oct. 30, 1998

[51] Int. Cl.$^7$ ................................ G01B 3/22; G01B 5/00
[52] U.S. Cl. ................................................ 33/533; 33/549
[58] Field of Search ............................ 33/533, 549, 551, 33/553, 554, 555, 556, 559, 832, 833

[56] References Cited

U.S. PATENT DOCUMENTS

| | | | |
|---|---|---|---|
| 2,969,597 | 1/1961 | Croshier | 33/533 |
| 3,534,480 | 10/1970 | Webb . | |
| 3,762,053 | 10/1973 | Day | 33/1 BB |
| 3,778,906 | 12/1973 | Palmenberg | 33/555 |
| 3,823,482 | 7/1974 | Schiler | 33/520 |
| 3,895,356 | 7/1975 | Kraus . | |
| 3,936,945 | 2/1976 | Jevremov . | |
| 4,083,116 | 4/1978 | Dillberg . | |
| 4,284,257 | 8/1981 | Murkens . | |
| 4,326,336 | 4/1982 | Hreha . | |
| 4,718,173 | 1/1988 | Eklund | 33/533 |
| 4,771,549 | 9/1988 | Shelangoskie et al. . | |
| 5,012,588 | 5/1991 | Face, III | 33/533 |
| 5,097,604 | 3/1992 | Brown . | |
| 5,207,007 | 5/1993 | Cucinotta et al. . | |
| 5,297,418 | 3/1994 | Champaigne . | |
| 5,687,487 | 11/1997 | Johnson . | |
| 5,875,559 | 3/1999 | Birang et al. | 33/553 |

OTHER PUBLICATIONS

"Dial Indicator Accessories: Depth Gages, Depth Gage Bases, Engraver's Depth Gage", Chicago Dial Indicator Co., Inc., Oct. 11, 1998, 5 pages.

"Metals Handbook Ninth Edition, vol. 5, Surface Cleaning, Finishing, and Coating", American Society For Metals, 5 pages, (1994).

*Primary Examiner*—Diego Gutierrez
*Assistant Examiner*—Faye Francis
*Attorney, Agent, or Firm*—Andrew C. Hess; Gerry S. Gressel

[57] ABSTRACT

An apparatus for measuring flatness of a surface includes a locator element slidingly engageable with a slider element in a first direction, and a height measuring instrument having a linear probing device is mounted to the slider element. An alignment feature is used for limiting relative motion between the sliding element and the locator element to the first direction when the slider element is engaged with the locator element. An exemplary embodiment includes a locator block having a top side and a bottom side and a slider block engageable with the locator block on the top side. An elongated aperture is disposed through the locator block and is elongated in the first direction. A mechanical dial indicator with a plunger rod projecting is mounted in the slider block and the plunger rod is positionable through the elongated aperture. A recessed slideway is disposed in the top side of the locator block and the slider block has a squared off end conforming to shape of the recessed slideway to limit relative motion between the blocks to the first direction.

14 Claims, 5 Drawing Sheets

FLATNESS GAGE

BACKGROUND OF THE INVENTION

1. Field of the Invention

This invention relates generally to flatness gages and dial indicators and, more particularly, to handheld flatness gages incorporating height measuring devices such as dial indicators, particularly as used in conjunction with Almen strip holders.

2. Discussion of the Background Art

Almen strips have long been used for quality control of shot peening processes. Flat holders are used to hold the Almen strips in shot peening cells to test the effectiveness and quality of the shot peening procedure and apparatus. Almen strips are well known for use in the field of shot peening quality control, see U.S. Pat. No. 2,620,838. The Almen strips are held in Almen strip holders and shot peened in the cells. The effectiveness of the Almen strip test and its usefulness as a quality assurance procedure is very much dependant on the repeatability of the Almen strip testing procedure. There is a need to assure the flatness of a flat surface of the Almen strip holder against which the Almen strip is held during the shot peening of the Almen strip. This is not always an easy thing to do, particularly, when the Almen strip holder is mounted on a model designed to simulate the part being shot peened. Models of gas turbine engine parts such as rotor disks and blades are often built with Almen strip holders mounted at key positions to simulate the shot peening process for quality control purposes. Almen strip holder flat surfaces should be flat and in one example it should be within 0.001 inches so that the Almen intensity values are not corrupted. Holders with flat surfaces that are slightly concave or convex can reduce or increase curvature of the peened strip and produce intensity values that are too low or too high. Simple fixtures with accessible Almen strip holders can be easily checked for flatness on a surface plate but Almen strip holders that are attached or welded to scrap parts or test models are difficult, if not impossible, to check. Therefore, it is very desirable to have a handheld device that is portable and capable of checking flatness of Almen strip holders in hard to reach or otherwise inaccessible locations. It is desirable to have an easy to use flatness measuring device that allows for a quick check of the flatness of the Almen strip holder. It is also desirable that the device be portable, handheld and operated, and easily maneuverable in order to be used on model positions that are difficult to access.

SUMMARY OF THE INVENTION

Briefly, in accordance with one aspect of the present invention, an apparatus for measuring flatness of a surface includes a locator element slidingly engageable with a slider element in a first direction, and a height measuring instrument having a linear probing device mounted to the slider element. An alignment feature is used for limiting relative motion between the sliding element and the locator element to the first direction when the slider element is engaged with the locator element.

In the preferred embodiment, the locator element is a locator block having a top side and a bottom side and the slider element is a slider block engageable with the locator block on the top side. An elongated aperture is disposed through the locator block and is elongated in the first direction. The linear probing apparatus is positionable through the elongated aperture. The alignment feature is a recessed slideway in one of the blocks adapted for receiving the other one of the blocks which has a squared off end conforming to a rectangular shape of the recessed slideway to limit relative motion between the blocks to the first direction. The recessed slideway is preferably in the top side of the locator block. The height measuring instrument may be a mechanical dial indicator with a plunger rod projecting therefrom which is the linear probing device. Other height measuring instruments may include digital height measuring instruments and devices. The dial indicator preferably includes a frame having a dial portion and a tube portion extending outward therefrom and circumscribing the plunger rod. The frame may be mounted to the slider block by the tube portion disposed in a holding aperture through the slider block. Standoff feet may be placed on the bottom side of the locator block and may be studs extending out from the bottom side of the locator blocks and may have tooling balls on bottom ends of the studs.

One particular embodiment of the present invention is an apparatus for measuring flatness of a Almen strip holding surface of an Almen strip holder. A centering feature is used for centering the probing means substantially along a longitudinal centerline of the Almen strip holding surface. The centering feature may be the elongated aperture generally centered along and disposed through the locator block and elongated in the longitudinal direction.

In the drawings as hereinafter described, a preferred embodiment is depicted; however, various other modifications and alternate constructions can be made thereto without departing from the true spirit and scope of the invention.

ADVANTAGES OF THE INVENTION

The present invention is effective in measuring the flatness of the flat holding surface of Almen strip holders and is useful in a quality assurance procedure is very much dependant on the repeatability of the Almen strip testing procedure. It is relatively small, portable, handheld, and easy to use by a shot peening machine operator during production and/or calibration of the shot peening machine. It can be used to assure the flatness of the flat surface of the Almen strip holder that is mounted on a model designed to simulate the part being shot peened and particularly ones that are difficult to access.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
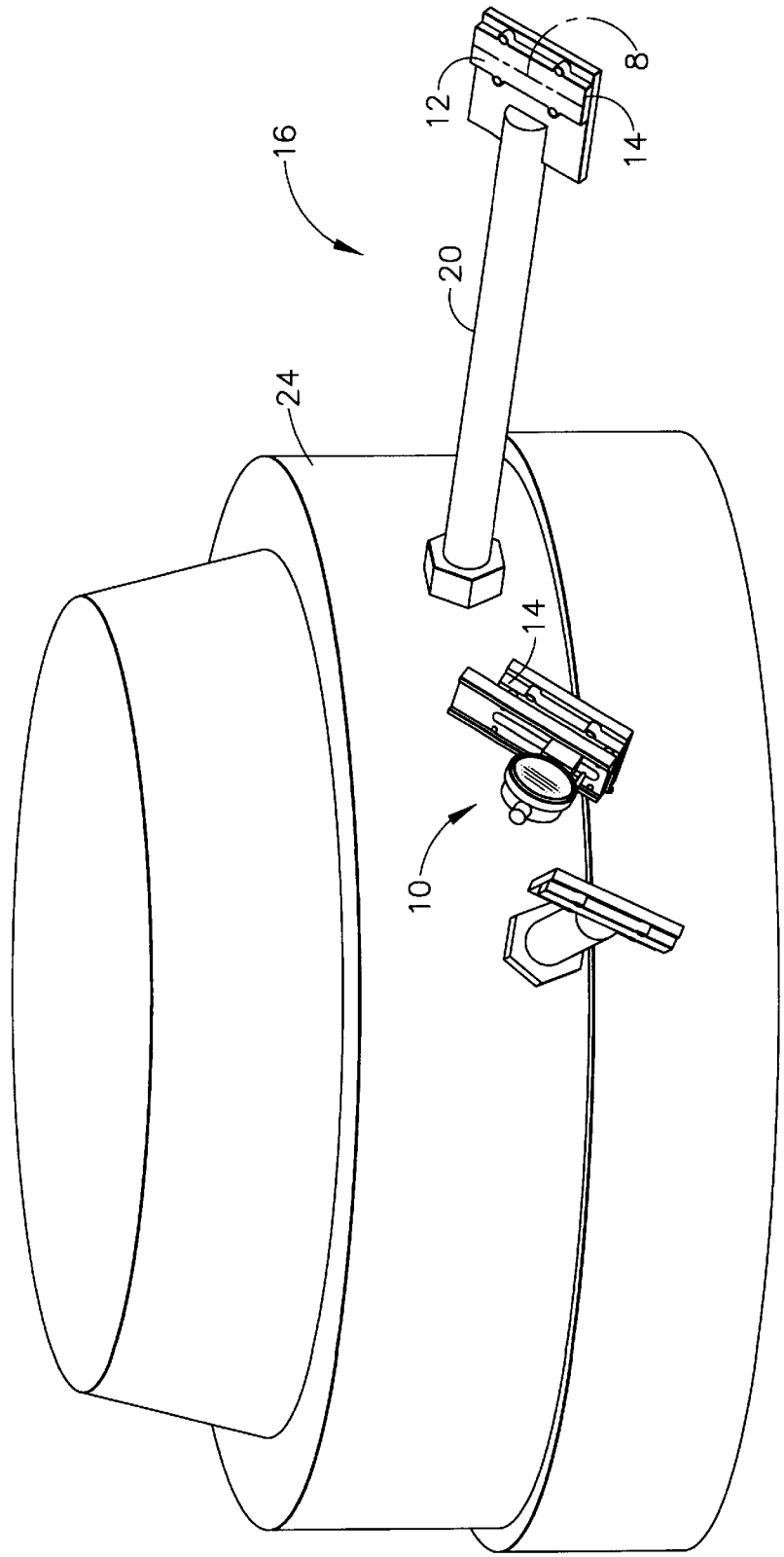
FIG. 1 is a perspective view of an apparatus for measuring flatness of Almen strip holders mounted on a shot peening model in accordance with an exemplary embodiment of the present invention.
Figure 2:
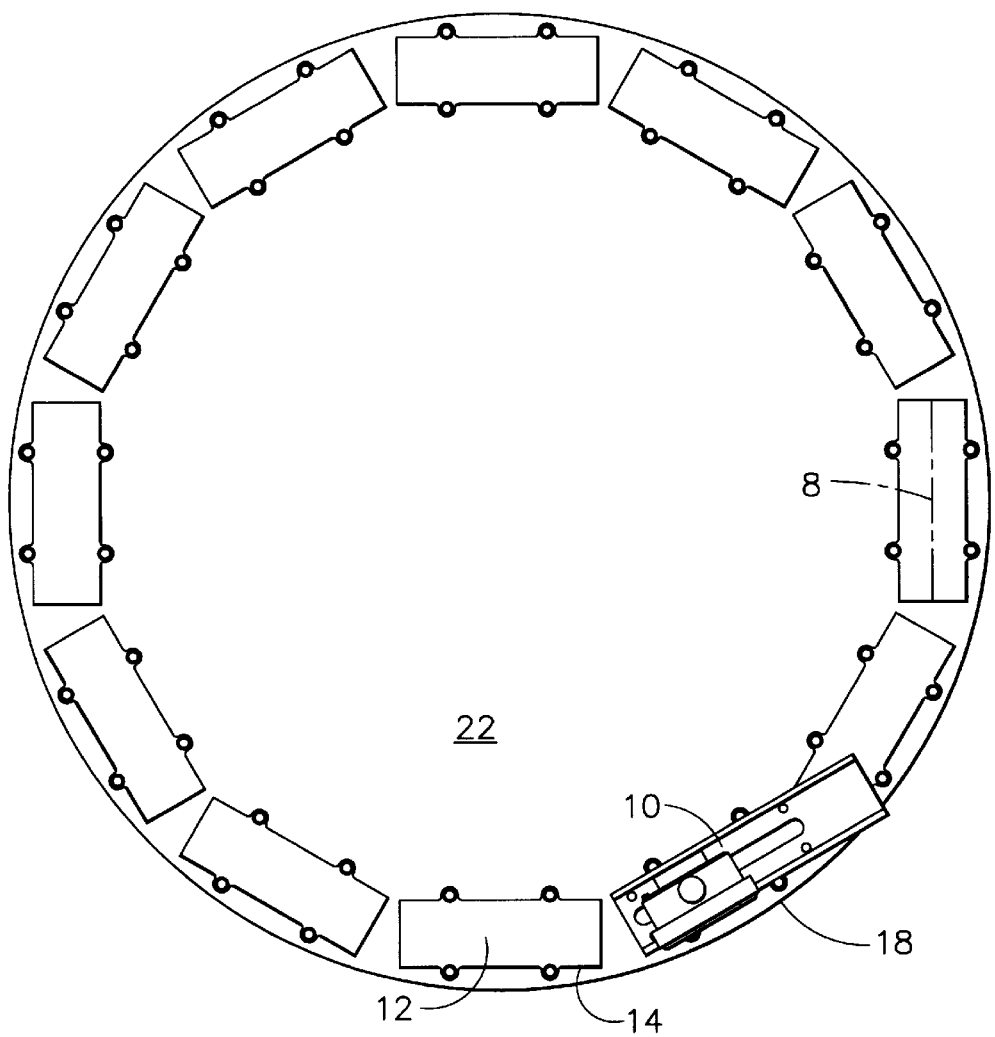
FIG. 2 is an elevated view of the apparatus for measuring flatness of Almen strip holders mounted on an alternative shot peening model.

Illustrated in FIG. 1 is an exemplary embodiment of an apparatus 10 used for measuring flatness of a surface such as an Almen strip holding flat surface 12 having a longitudinally extending centerline 8 on an Almen strip holder 14. Almen strip holders 14 are used on shot peening models for quality assurance of shot peening processes, machines, and cells. A rotor and blade model 16 is illustrated in FIG. 1 while a rotor disk model 18 is illustrated in FIG. 2. The Almen strip holders 14 are mounted on mounting rods 20 extending radially from a conical body 24 which models a rotor section of a gas turbine engine. The Almen strip holders 14 are portioned to represent the areas for quality assurance testing of the rotor parts they represent. In FIG. 2 the Almen strip holders 14 are portioned to represent positions on blades of a rotor that shot peened. The Almen strip holders 14 are mounted directly to a circular surface 22 of the disk model 18 in FIG. 2.

Figure 3:
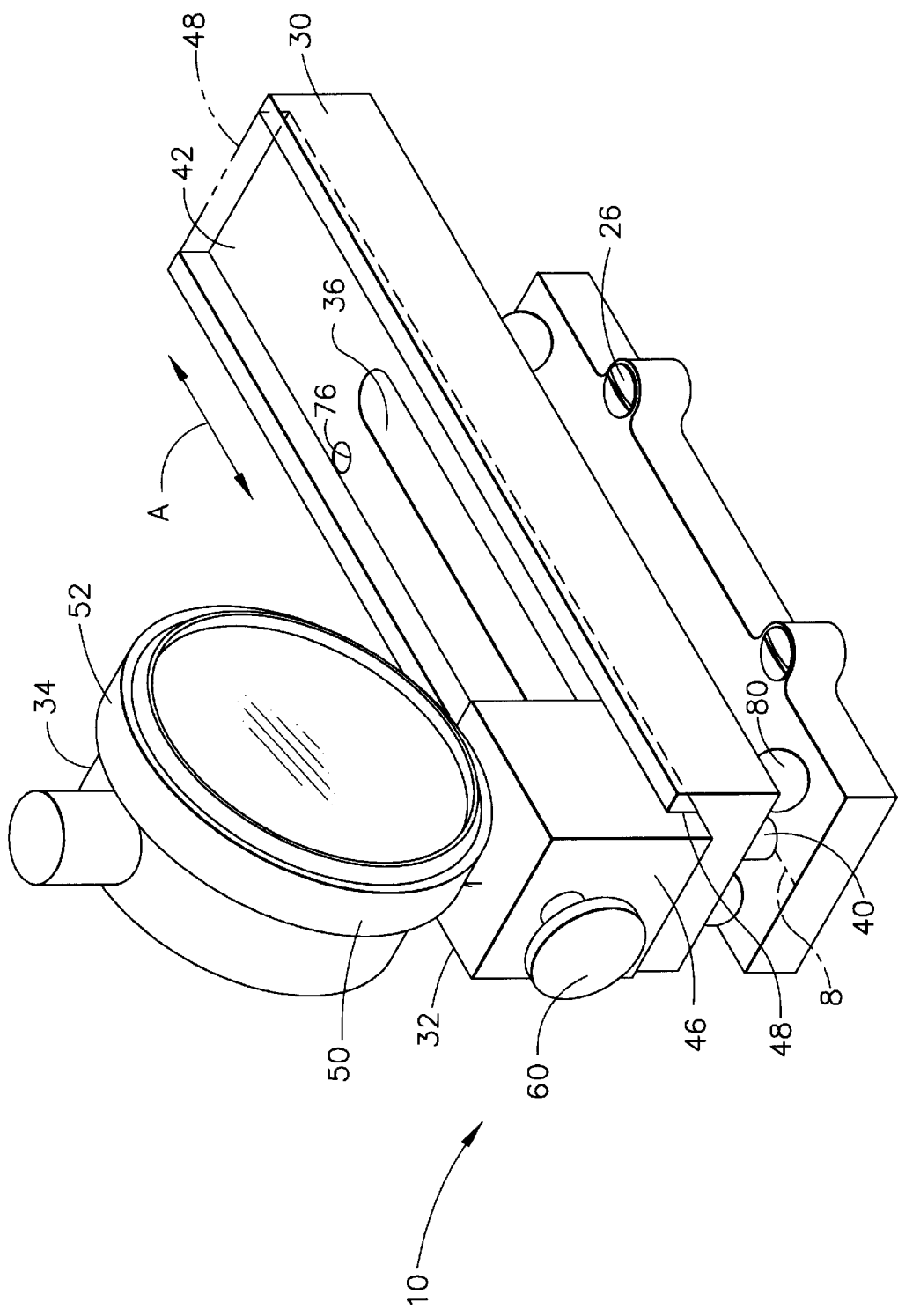
FIG. 3 is an enlarged view of the apparatus for measuring flatness diffuser over an Almen strip holder illustrated in FIGS. 1 and 2.
Figure 4:
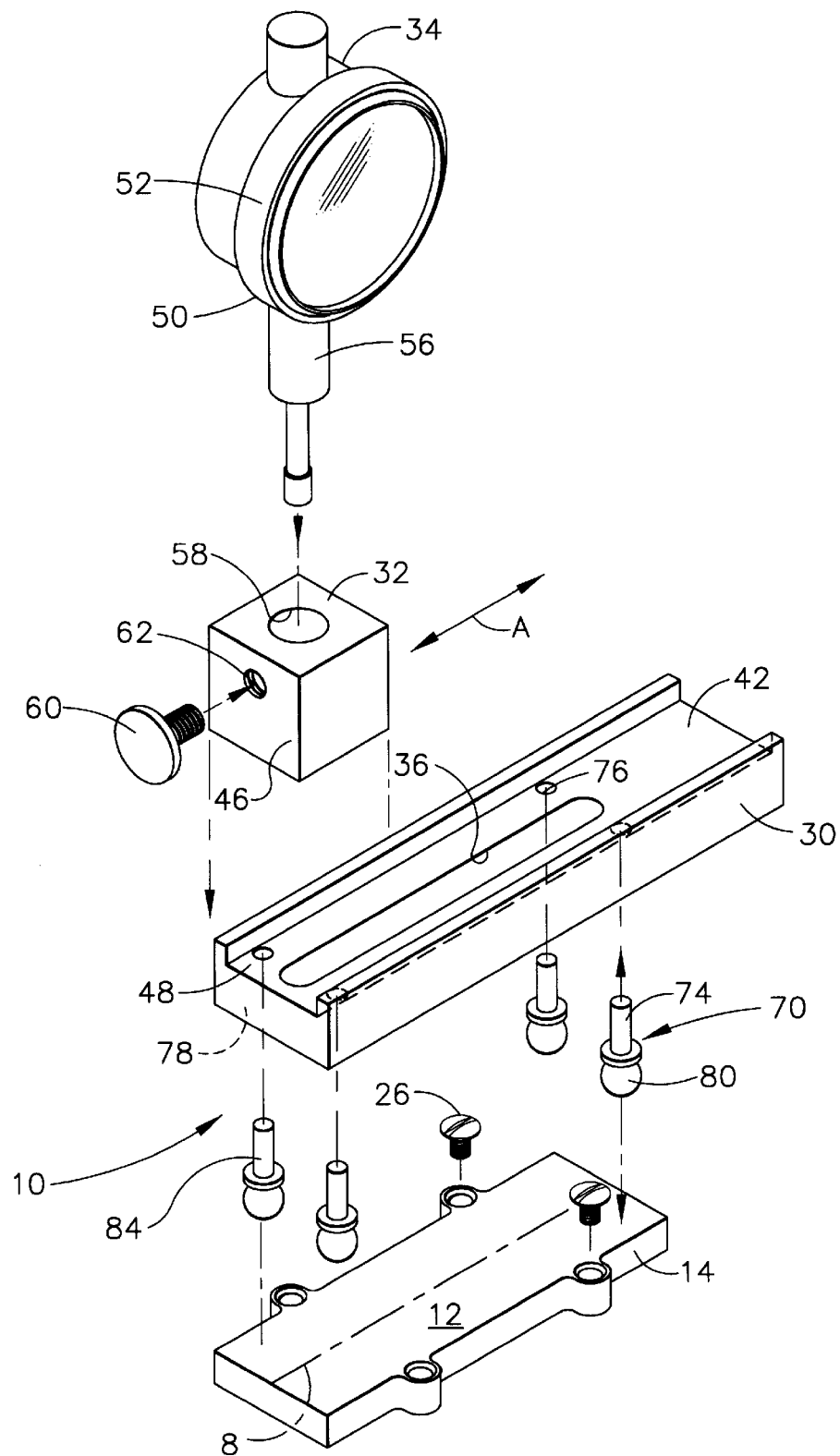
FIG. 4 is an exploded view of the apparatus illustrated in FIG. 3.

Illustrated in FIGS. 3 and 4 is the Almen strip holder 14 and the flat surface 12 upon which an Almen strip (not shown) is placed and secured by hold down screws 26. The apparatus 10 is used to measure the flatness of the flat surface 12 by measuring variances in the height of the surface. A locator block 30 is placed over the flat surface 12 and a slider block 32 is slideably engaged with the locator block. A dial indicator 34 exemplifies one type of height measuring means that can be attached to the slider block 32 to make flatness or height measurements on the flat surface 12. A longitudinally elongated aperture 36 is disposed through the locator block 30 and a plunger rod 40, an exemplary linear probing means, is positionable through the elongated aperture to engage the flat surface 12. The dial indicator 34 has a frame 50 with a dial portion 52 and a tube portion 56 extending outward therefrom and circumscribed about said rod 40. The frame 50 is mounted to the slider block 32 by the tube portion 56 disposed in a holding aperture 58 through the slider block and removably secured in place by set screw 60 in a threaded aperture 62 through the slider block 32 which interacts the holding aperture 58.

Alignment of the plunger rod 40 with the longitudinally extending centerline 8 is provided by a recessed slideway 42 in the locator block 30 for receiving the slider block 32. The slider block 32 has a squared off end 46 conforming to a rectangular shape 48 of the recessed slideway 42 to limit relative motion between the blocks back and forth in a first longitudinal direction indicated by arrow A.

Standoff feet 70 on a bottom side 78 of the locator block 30 facilitates the handheld application and positioning of the locator block on the flat surface 12. The standoff feet 70 are illustrated as threaded studs 74 extending out from threaded apertures 76 on a bottom side 78 of the locator block 30 and tooling balls 80 may be used on bottom ends 84 of the studs. This configuration helps prevent and minimizes scuffing and scratching of the flat surface 12.

Figure 5:
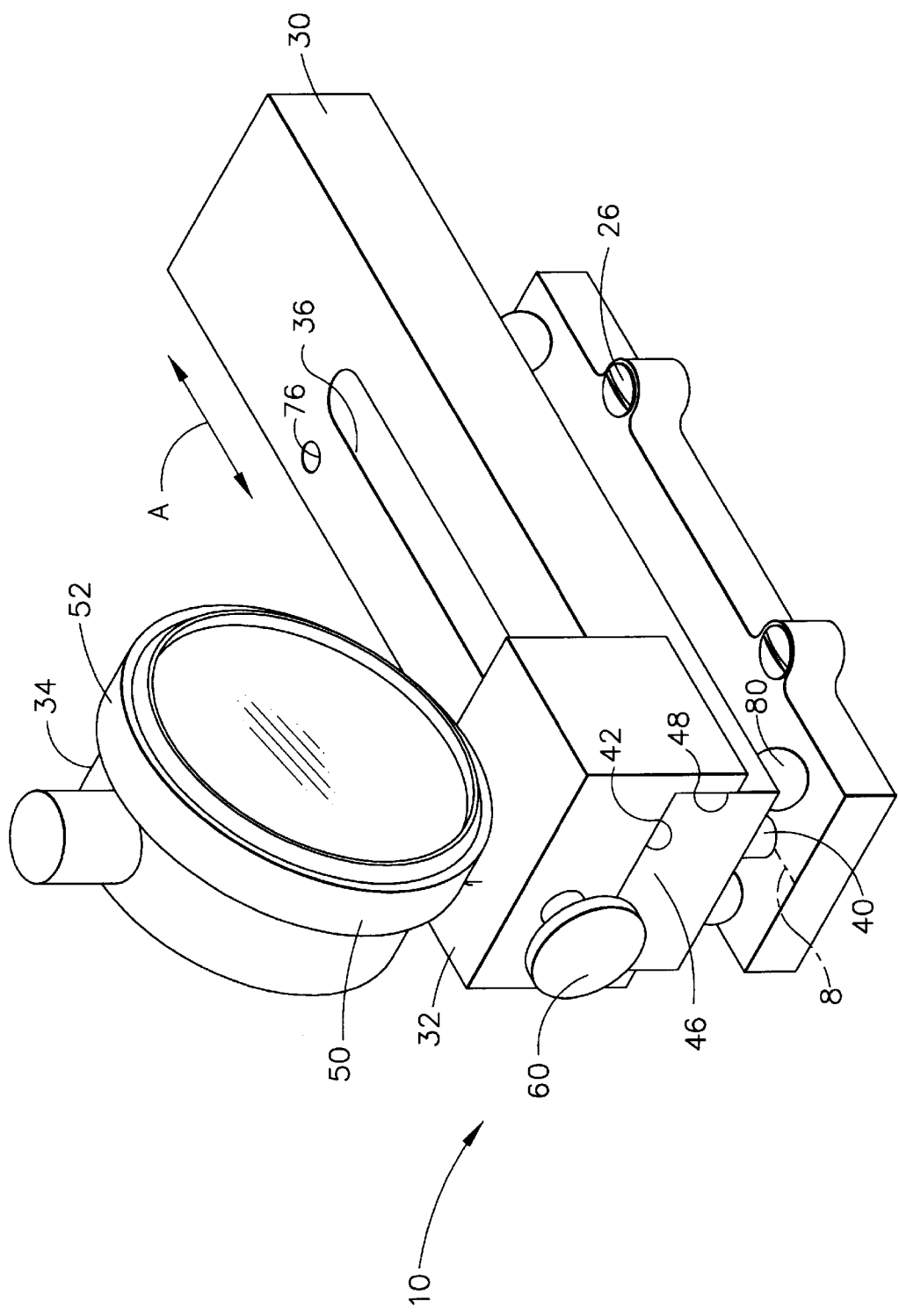
FIG. 5 is an elevated view of an alternate embodiment of the apparatus in FIG. 3.

Illustrated in FIG. 5 is an alternative embodiment with the recessed slideway 42 in the slider block 32 for receiving the locator block 30. The locator block 30 has the squared off end 46 conforming to the rectangular shape 48 of the recessed slideway 42 in the slider block 32 to limit relative motion between the blocks back and forth in the first longitudinal direction indicated by the arrow A.

While the preferred embodiment of our invention has been described fully in order to explain its principles, it is understood that various modifications or alterations may be made to the preferred embodiment without departing from the scope of the invention as set forth in the appended claims.

What is claimed is:

1. An apparatus for measuring flatness of a surface comprising:

a locator means slidingly engageable with a slider means in a first direction, a height measuring means with a linear probing means, said height measuring means mounted to said slider means, an alignment means for limiting relative motion between said sliding means and said locator means to said first direction when said slider means is engaged with said locator means, an elongated aperture disposed through said locator means, said elongated aperture elongated in said first direction, and said linear probing means is positionable through said elongated aperture.

2. An apparatus for measuring flatness of a surface comprising:

a locator block slidingly engageable with a slider block in a first direction, a height measuring means with a linear probing means, said height measuring means mounted to said slider means, an alignment means for limiting relative motion between said sliding means and said locator means to said first direction when said slider means is engaged with said locator means, said locator block having a top side and a bottom side wherein said slider block is engageable with said locator block on said top side, an elongated aperture is disposed through said locator block, said elongated aperture elongated in said first direction, and said linear probing means is positionable through said elongated aperture.

3. An apparatus as claimed in claim 2 wherein said alignment means comprises a recessed slideway in one of said blocks for receiving the other one of said blocks and said other one of said blocks has a squared off end conforming to shape of said recessed slideway to limit relative motion between said blocks to said first direction.

4. An apparatus as claimed in claim 3 wherein said height measuring means comprises a dial indicator and said linear probing means comprises a plunger rod projecting therefrom.

5. An apparatus as claimed in claim 4 wherein said dial indicator includes a frame having a dial portion and a tube portion extending outward therefrom and circumscribing said plunger rod, and said frame is mounted to said slider block by said tube portion disposed in a holding aperture through said slider block.

6. An apparatus as claimed in claim 5 further comprising standoff feet on said bottom side of said locator block.

7. An apparatus as claimed in claim 6 wherein said standoff feet comprise studs extending out from said bottom side and tooling balls on bottom ends of said studs.

8. An apparatus for measuring flatness of an Almen strip holding surface of an Almen strip holder, said apparatus comprising:

a locator means slidingly engageable with a slider means in a longitudinal direction, a height measuring means with a linear probing means, said height measuring means mounted to said slider means, a centering means for centering said probing means substantially along a longitudinal centerline of the Almen strip holding surface extending in said longitudinal direction, said centering means including an elongated aperture generally centered along and disposed through said locator means, said linear probing means is positionable through said elongated aperture, and an alignment means for limiting relative motion between said sliding means and said locator means to said longitudinal direction when said slider means is engaged with said locator means.

9. An apparatus for measuring flatness of a Almen strip holding surface of an Almen strip holder, said apparatus comprising:

a locator block slidingly engageable with a slider block in a longitudinal direction, a height measuring means with a linear probing means, said height measuring means mounted to said slider means, a centering means for centering said probing means substantially along a longitudinal centerline of the Almen strip holding surface extending in said longitudinal direction, an alignment means for limiting relative motion between said sliding means and said locator means to said longitudinal direction when said slider means is engaged with said locator means, said locator block having a top side and a bottom side wherein said slider block is engageable with said locator block on said top side, said centering means comprises an elongated aperture generally centered along and disposed through said locator block, said elongated aperture elongated in said longitudinal direction, and said linear probing means is positionable through said elongated aperture.

10. An apparatus as claimed in claim 9 wherein said alignment means comprises a recessed slideway in one of said blocks for receiving the other one of said blocks and said other one of said blocks has a squared off end conforming to shape of said recessed slideway to limit relative motion between said blocks to said longitudinal direction.

11. An apparatus as claimed in claim 10 wherein said height measuring means comprises a dial indicator and said linear probing means comprises a plunger rod projecting therefrom.

12. An apparatus as claimed in claim 11 wherein said dial indicator includes a frame having a dial portion and a tube portion extending outward therefrom and circumscribing said plunger rod and said frame is mounted to said slider block by said tube portion disposed in a holding aperture through said slider block.

13. An apparatus as claimed in claim 12 further comprising standoff feet on said bottom side of said locator block.

14. An apparatus as claimed in claim 13 wherein said standoff feet comprise studs extending out from said bottom side and tooling balls on bottom ends of said studs.

* * * * *